Jan. 9, 1934.　　　　K. C. D. HICKMAN　　　　1,942,857

MEASURING DEVICE

Filed Jan. 27, 1930

Inventor
Kenneth C. D. Hickman.

By Newton M. Perris
Daniel I. Mayne
Attorneys

Patented Jan. 9, 1934

1,942,857

UNITED STATES PATENT OFFICE 1,942,857

MEASURING DEVICE

Kenneth C. D. Hickman, Rochester, N. Y., assignor to Eastman Kodak Company, Rochester, N. Y., a corporation of New York Application January 27, 1930. Serial No. 423,679

4 Claims. (Cl. 73—52)

This invention relates to measuring instruments employing a column of mercury, such as vacuum gauges, barometers, thermometers and the like.

It has been noted that an error is introduced into all such instruments due to the fact that the meniscus at the top of the column of mercury changes its contour depending on the direction of its movement. If the movement of the column is downward, the meniscus becomes flatter whereas if the mercury column is moving upward it is more convex due to the fact that the mercury does not wet the glass forming the containing tube and also due to the fact that impurities (chiefly oxides) almost necessarily present in the mercury cause adherence of the mercury column to the glass with consequent irregularity of the meniscus and failure of flow of the mercury at times. When the glass tube surrounding the mercury column is a capillary tube, an additional difficulty is present in distinguishing the height of the mercury column owing to the fact that the walls of the capillary tube above the mercury column reflect light similarly to the manner of mercury. In an attempt to reduce this difficulty the rear of the capillary tubes of thermometers has frequently been coated with glass of one or more colors in order to provide a suitable background so that the height of the mercury column may be distinguished for easy reading. Even with this provision, mercury thermometers are still hard to read when viewed from an unfavorable angle. It has further been noted that when such instruments are exposed to certain temperatures, mercury in the column vaporizes and condenses in the upper part of the instrument tube thereby introducing another source of error.

In accordance with one feature of the present invention it is proposed to introduce in the glass tube above the mercury column a liquid which lubricates the glass of the tube at its junction with the top of the mercury column whereby the shape of the meniscus and flow of the column is rendered normal at all times. A further feature of the invention includes the use of a material in the glass tube above the mercury column which material prevents distillation of the mercury at temperatures ordinarily encountered in the use thereof. A specific feature of the invention includes filling the capillary tube above the mercury column of a thermometer with a liquid or other material having a refractive index preferably substantially equal to the glass used so that the thermometer may be easily read, a reservoir, of course, being provided for expansion.

Figure 1:
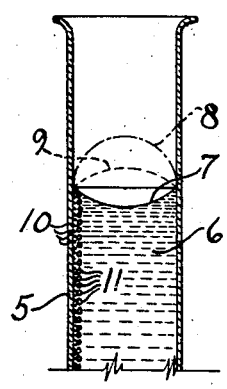
Figure 2:
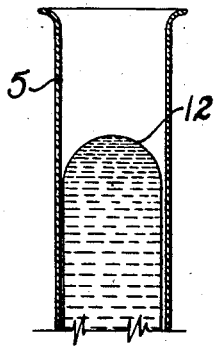

These and other features will appear from the detailed description and claims when taken with the drawing in which Fig. 1 is a diagram representing the distortion of the meniscus of a mercury column under ordinary circumstances when moved upward and downward; Fig. 2 is a diagram representing substantially the contour of the meniscus during both directions of movement when the material of the present invention is employed; and Fig. 3 is a perspective view of a thermometer illustrating a specific application of the present invention.

Referring to Fig. 1 there is represented a portion of a glass tube 5 of a measuring instrument having a mercury column 6 therein. When such a mercury column moves rapidly downward, its upper surface 7 will be concave whereas if this column is moved rapidly upward the shape of its meniscus 8 will be convex until it gradually assumes a position of rest as indicated at 9. This variable contour of the mercury meniscus which introduces an error in the measurements of the instruments employing mercury, is in part due to the fact that mercury adheres to the walls of its containing glass tube so that there is a layer 10 of mercury molecules attached to the glass with the result that the inner molecules such as 11 of the mercury column must slide over the adhering layer during any movement thereof. The adhering layer 10 does not substantially impede the passage of the mercury column except at the ends of the column where the mercury leaves the glass and meets the air. As the mercury column advances or recedes, mercury molecules must be laid against or torn from the glass surface. For a more complete discussion of this phenomenon of the mercury meniscus reference is made to applicant's paper entitled "The mercury meniscus" appearing in pages 190 to 212 inclusive of the "Journal of the Optical Society of America and Review of Scientific Instruments", volume 19, #4.

It has been discovered, however, that if a suitable lubricating material, hereinafter described, is introduced into the glass tube containing the mercury column, the shape of the meniscus is maintained substantially uniform as indicated at 12 in Fig. 2, even when it is in motion, due to the fact that a thin layer of the lubricant is interposed between the mercury and the glass.

Figure 3:
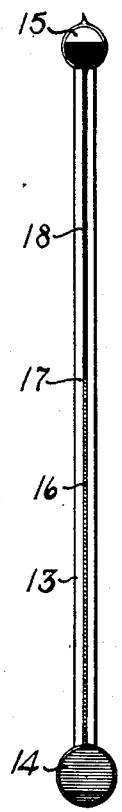

For a specific application of the invention to a mercury thermometer, reference is made to Fig. 3. This theremometer comprises a capillary tube 13 terminating at its lower end in a bulb or mercury reservoir 14 and at its upper end in a second closed bulb or reservoir 15. The bulb 15 should be large enough to accommodate a supply of liquid sufficient to fill the air column when the mercury is in its lowest position and to store this liquid when the mercury column is elevated to its maximum position or the reservoir 15 may be dispensed with and the column above the mercury be only partially filled with lubricant. In this figure mercury is represented in the bulb 14 and a portion of the capillary tube which is herein referred to as the mercury column 16. The upper surface or the meniscus 17 of this column in former thermometers was subject to changes in contour during movement as illustrated in Fig. 1 which introduces an error in the thermometric reading. In addition to this difficulty much trouble has been encountered in reading mercury thermometers owing to the fact that the portion 18 of the capillary tube above the mercury column is similar in appearance to the mercury column so that a thermometer of this type is difficult to read except at the most favorable angle.

In the usual mercury thermometer at certain temperatures the mercury in the column vaporizes and condenses on the upper part of the capillary tube thereby introducing another source of error into the thermometer.

It has been discovered that the adhesion difficulties may in a large part be eliminated and the other difficulties be removed if there is introduced into the capillary tube above the mercury column a liquid or other material having the following characteristics:

First: It should have substantially the same index of refraction as the glass used in the thermometer.

Second: It should lubricate the junction of the mercury column with the air column in the capillary tube.

Third: It should not decompose or cease to lubricate at temperatures at which the thermometer is used.

Fourth: It should not creep in quantity below the mercury surface and pinch or otherwise distort the mercury column.

Fifth: It should have a low vapor pressure at the temperatures of its employment.

An important requisite for a lubricant of the present invention is that it shall have a low boundary friction and yet shall be so powerfully adsorbed by the glass that is resists squeezing out even under high pressures. For no matter how perfectly flooded a glass tube may be at the commencement, after resting a little the mercury will squeeze out the excess lubricant if it is not of the proper kind and boundary conditions will intervene. I have found that while certain pure liquids are especially suitable for use as lubricants their properties in this respect are enhanced if small quantities of certain activating substances are also present.

I have found that a class of substances which admirably fill the above named qualifications for a mercury lubricant are the butyl, benzyl and amyl esters of the unsubstituted benzene dicarboxylic acids. More specifically, I have found that di-butyl phthalate, di-benzyl phthalate, butyl benzyl phthalate, iso-amyl phthalate, normal-amyl phthalate and butyl tere-phthalate, all belonging to the above class of esters, are excellent lubricants for the meniscus of a mercury column. Where an extremely high vacuum is employed above the mercury column, such as that vacuum obtained in the best equipped physical laboratories, the lubricant employed should be one having the lowest possible vapor pressure, such, for instance, as di-benzyl phthalate or, in second preference, butyl benzyl phthalate. Other of the esters named might be employed under high vacuum but with a slightly lesser degree of success.

Under a moderate vacuum, such as that ordinarily produced commercially and customarily employed in thermometers and the like, any of the butyl, benzyl and amyl esters of the benzene dicarboxylic acids, such as those above named may be employed with success. I have found it preferable for reasons of economy to employ di-butyl phthalate (which is frequently termed butyl phthalate) although it will be apparent that any of the other esters of the phthalic acids, or their equivalents, may also be employed.

Under the lower vacuums, such as a moderate or commercial vacuum, where the tendency for the mercury to oxidize is greater and where a slightly less pure mercury is sometimes employed. I have found that the lubricating properties of the esters may be greatly prolonged and somewhat enhanced if there be added to the ester an activator having certain properties. For instance an ideal activator will dissolve, peptize or surround any impurities in the mercury so that they no longer impair the free movement of the mercury meniscus; such activators also have been found to greatly retard the tendency of the mercury column to squeeze out the lubricant from between the column and the glass container. Activators which I have found very suitable are mercury di-para-tolyl and phenyl hydrazine. Certain other activators may be employed such, for instance, as other organic mercury compounds like mercury di-para-tolyl or strong organic reducing agents like phenyl hydrazine provided they have the properties above named. When the lubricant is employed under a moderate vacuum a small quantity of either of these activators may be added to any of the above named lubricants to improve its quality. For instance, in the case of mercury di-para-tolyl which is only slightly soluble in the lubricants mentioned I have found that about the right amount of this activator will be introduced if the lubricant to be employed is saturated with mercury di-para-tolyl.

Phenyl hydrazine, however, is miscible to a considerable extent with the lubricants mentioned and when it is, therefore, desired to add phenyl hydrazine to the lubricant I have found that approximately 2% of the phenyl hydrazine will suffice. I have also found that where the lubricants are employed with mercury in a high vacuum the necessity and advisability of adding an activator to the lubricant diminishes.

It will be noted that the above named lubricants may be defined broadly as organic substances which have an index of refraction between 1.5 and 1.7 which is substantially the index of refraction of most glass which is employed in instruments making use of a mercury column. My invention, therefore, includes the important feature of employing above the mercury column a liquid which has an index of refraction substantially that of the glass employed to hold the column, so that reflections of the mercury in the glass are totally or substantially absent making the reading of the meniscus very easy and clear cut. Therefore, while the lubricants I employ have substantially the same index of refraction as the glass, that quality is in no way a necessary incident to the lubricant as lubricants with different indexes of refraction than glass may be employed if one is willing to forfeit this property. In fact, there may well be instances where the lubricating quality of the liquid is of less materiality than the index of refraction, although so long as both properties may be had in the same liquid such a liquid may as well be employed. The liquids employed may, however, be mixtures of substances which have refractive indexes above or below the index of the glass used, the refractive index of the mixture being substantially that of glass. Thus halogenated hydrocarbons such as chlor naphthalene may be mixed with such liquids as ethyl oleate or medicinal paraffin and used in the thermometer or other measuring device.

The plain oleate or paraffin may be used alone with considerable improvement in the reading even though the refractive index of these liquids is not strictly that of glass. However, liquids of this latter class, which are excellent lubricants, are the derivatives of ethylene glycol such as mono methyl ether of tetraethylene glycol or the ethyl ether of diethylene glycol.

In preparing a thermometer of this kind the usual capillary tube 13 and reservoir or bulb 14 joined thereto are formed with an open bulb 15 at the upper end of the tube. Mercury is introduced into the bulb 14 and a portion of the capillary tube 13 after which the remainder of the capillary tube and a portion of the bulb 15 at the top thereof may be filled with one of the specified liquid mixtures whereupon the empty portion of the bulb 15 is treated so that only an atmosphere of the vapor or the liquid used, exists therein. The top of the bulb 15 is then sealed after which the thermometer is graduated in the usual manner. As hereinbefore stated the bulb 15 may be omitted and a mere column of the lubricant above the mercury column may be employed. That is, a column of lubricant less than the length of the column above the mercury may be employed so long as sufficient room is left for the expansion of the mercury column within the limits intended. The bulb 15 is desirable as it permits the use of a column of a length not substantially in excess of that necessary to accommodate the expansion of the mercury within the range of temperatures for which the instrument is to be employed. Other changes obvious to those skilled in the art may be made and it will be understood that the present disclosure is merely for purposes of explanation and is not to be construed in a limiting sense except as defined by the following claims.

What I claim as my invention and desire to be secured by Letters Patent of the United States is:

1. In a measuring instrument comprising a capillary tube communicating with a reservoir and provided with mercury in the reservoir and a portion of the tube, means for lubricating the mercury meniscus and maintaining its normal contour at all points of travel in the tube and for preventing distillation of the mercury comprising a column of liquid superimposed on the mercury and adapted to travel through the tube simultaneously therewith, said liquid comprising a compound selected from the group consisting of butyl, benzyl, and amyl esters of the unsubstituted benzene dicarboxylic acids, and also containing an activating agent in solution which neutralizes the retarding effect of impurities in the mercury on the free travel of the mercury column in the tube, said agent being selected from the group consisting of mercury di-para-tolyl and phenyl hydrazine.

2. The mechanism of claim 1 in which the liquid lubricant is di-butyl phthalate and the activating agent is selected from the group consisting of mercury di-para-tolyl and phenyl hydrazine.

3. The mechanism of claim 1 in which the liquid lubricant is di-butyl phthalate and the activating agent is mercury di-para-tolyl.

4. The mechanism of claim 1 in which the lubricating liquid comprises di-butyl phthalate containing in solution approximately 2% of mercury di-para-tolyl.

KENNETH C. D. HICKMAN.